United States Patent [19]

Hopkinson et al.

[11] Patent Number: 4,707,822
[45] Date of Patent: Nov. 17, 1987

[54] TOMOGRAPHIC APPARATUS

[75] Inventors: James F. Hopkinson, Vernon Hills, Ill.; Kyojiro Nambu, Otawara, Japan

[73] Assignee: Kabushiki Kaisha Toshiba, Kawasaki, Japan

[21] Appl. No.: 732,260

[22] Filed: May 9, 1985

[51] Int. Cl.[4] .............................................. G06F 15/42
[52] U.S. Cl. .................................... 364/414; 378/901; 364/581
[58] Field of Search ........................ 378/901; 364/414; 369/581

[56] References Cited

U.S. PATENT DOCUMENTS

| 4,075,492 | 2/1978 | Boyd et al. | 364/414 |
| 4,149,247 | 4/1979 | Pavkovich et al. | 364/414 |
| 4,284,896 | 8/1981 | Stonestrom | 364/414 |
| 4,293,912 | 10/1981 | Walters | 364/414 |
| 4,326,252 | 4/1982 | Kohno | 378/901 |
| 4,583,241 | 4/1986 | Walters | 378/901 |

OTHER PUBLICATIONS

Ramachandran et al., Acad. Sci., 68: 2236, 1971 p. 53.
"Reconstruction from Divergent Ray Data" A. V. Lakshminarayanan, Technical Report No. 91, Jan. 1975.
"Short-Scan Fan-Beam Algorithms for CT", Abraham Naparstek, IEEE Transactions on Nuclear Science, vol. NS-27, No. 3, Jun. 1980.
"Optimal Short Scan Convolution Reconstruction for Fanbeam CT", Dennis L. Parker, Med. Phys. 9(2), Mar./Apr. 1982.
"Optimization of Short Scan Convolution Reconstruction in Fan Beam CT" by Dennis L. Parker, IEEE 1982.

Primary Examiner—Jerry Smith
Assistant Examiner—Gail Hayes
Attorney, Agent, or Firm—Finnegan, Henderson, Farabow, Garrett & Dunner

[57] ABSTRACT

An apparatus for reconstructing a tomographic image of an object which is positioned within a scanning circle and which is scanned by a fan-shaped beam of radiation partially rotating around the scanning circle. Source fan sets of data are sorted into detector fan sets of data, some of which contain overlapping data. A weighting function is applied to the overlapping data. Convolution of the detector fan sets of data including data average by the weighting function is performed without reordering the detector fan data into parallel data to derive convoluted data which may be back projected and accumulated and ultimately utilized to display an image of the scanned object. Preferably a non-oscillating convolution function is employed.

10 Claims, 7 Drawing Figures

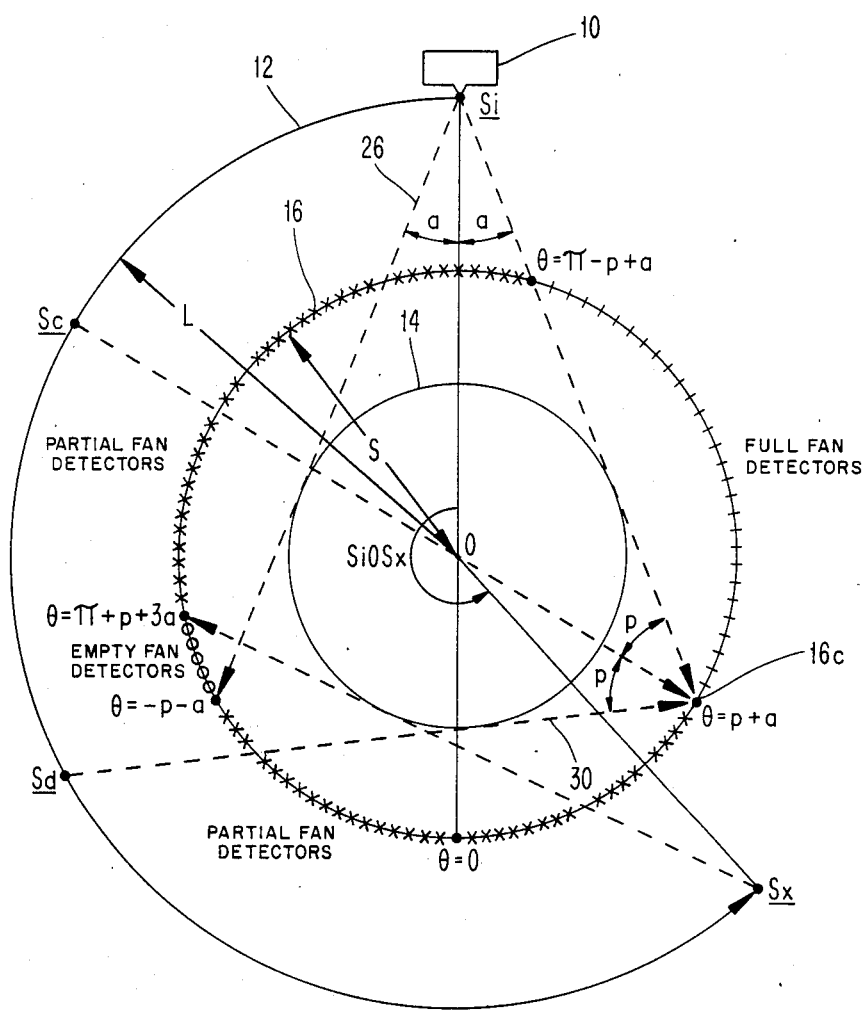

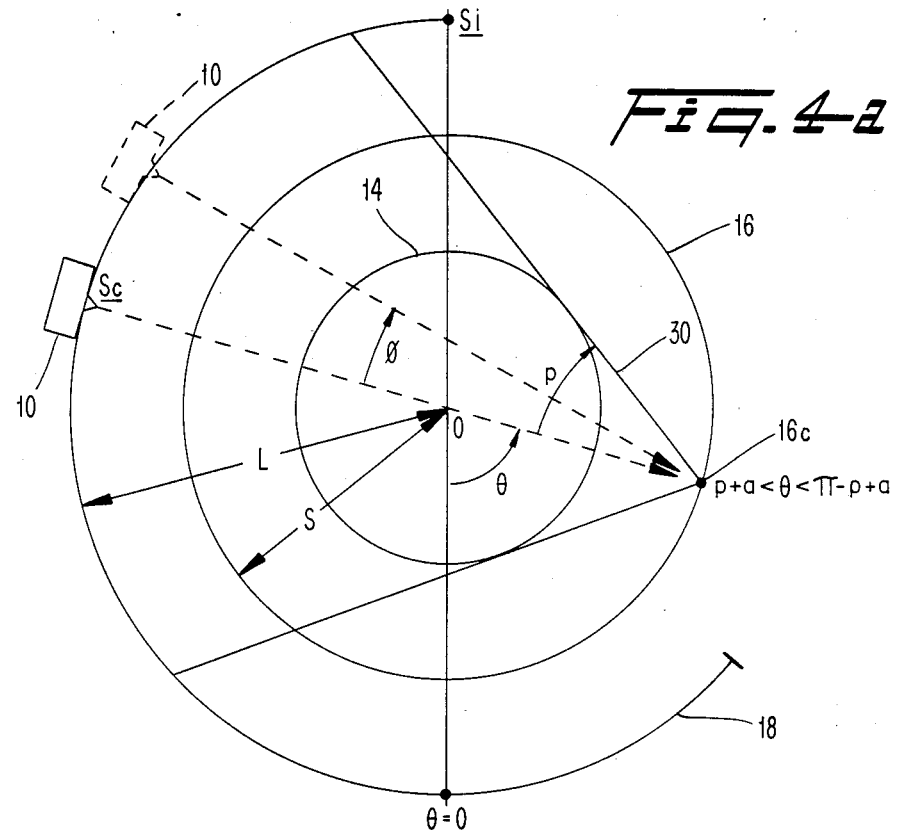
*Fig. 4-a*
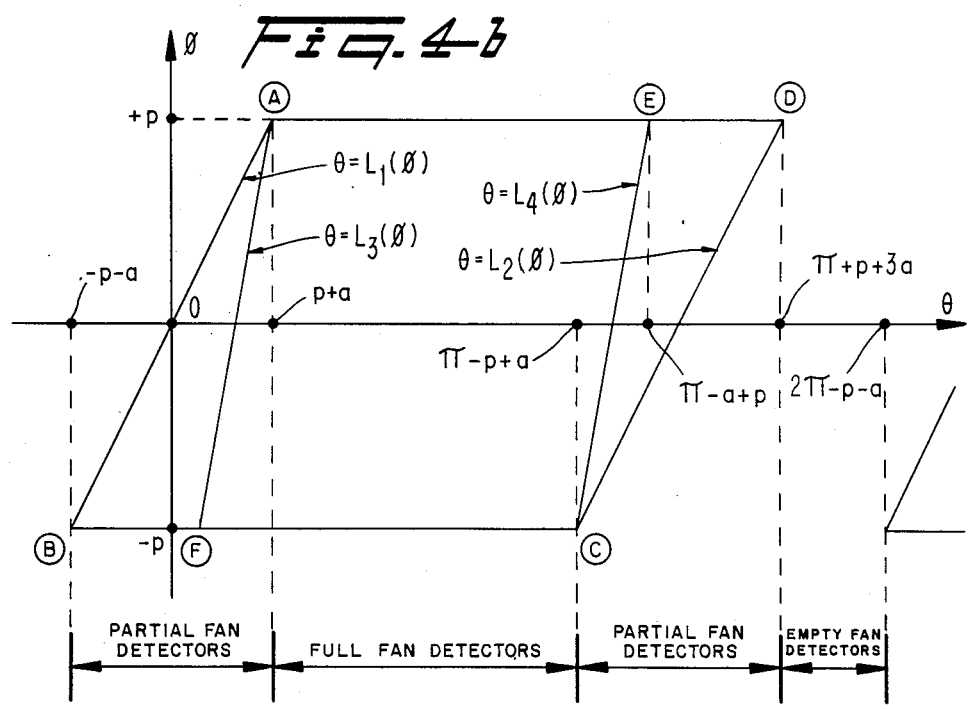
*Fig. 4-b*

TOMOGRAPHIC APPARATUS

BACKGROUND OF THE INVENTION

I. Field of the Invention

This invention relates to a fourth generation medical computerized tomographic (CT) apparatus. This invention particularly relates to a fourth generation medical CT apparatus which is capable of reconstructing a section of an image from data produced by a partially rotated source having a fan-shaped beam of radiation energy.

II. Background of the Invention

Fourth generation medical CT apparatus are known in which a source of radiation is rotated about an object being scanned. For example, in FIG. 1 a source of radiation 10 is shown rotated counterclockwise in an orbit 12 from a first position Si. Within the arc defined by rotation of source 10 is a scanning circle 14 within which an object under observation may be placed.

Source 10 generates a narrow fan-beam of radiation which has an apex or source fan angle of 2a as shown in FIG. 1. Source fan angle 2a is preferably chosen so that the resultant fan-beam from source 10 completely encompasses scanning circle 14.

Detectors 16 are typically located around a circle cocentered with scanning circle 14. As source 10 rotates the resultant source fan-beam strikes selected groups of detector elements 16. When rotation of source 10 is completed, data collected from each detector element 16 may be reordered and collected in data sets which each define a detector fan-beam. A detector fan-beam of data, therefore, comprises data collected for any particular detector element 16 as the source fan-beam from source 10 passes by that detector element.

In a third generation medical CT apparatus both the source and detectors simultaneously rotate around the object being scanned. Such an apparatus is, for example, disclosed in U.S. Pat. No. 4,075,492 issued to Boyd et al. In the Boyd et al. apparatus divergent rays from the rotating source strike the rotating detectors. The resultant divergent detector fan-beam data is reordered into parallel ray detector fan-beam data format. Parallel ray data format is data in a format corresponding to the data which would have been received if parallel rays of radiation had passed through the scanning circle, instead of the divergent rays from the rotating source. The parallel ray data is then subjected to convolution and back projection in Boyd et al. to reconstruct an image of the object under observation.

Another reconstruction system using fan-beams is disclosed in an article by A. B. Lakshminarayanan entitled "Reconstruction From Divergent Ray Data," Technical Report No. 92, State University of New York at Buffalo, Department of Computer Science, January 1975. This article suggests reconstruction of images without reordering the divergent detector fan-beam data into parallel ray data. This method of image reconstruction has the obvious advantage of avoiding the difficulty of determining parallel ray data from divergent ray fan-beam data. The Lakshminarayanan method performs convolution and back projection without such reordering and this method is sometimes referred to as a direct fan-beam reconstruction method.

Methods of image reconstruction such as those taught by Boyd et al. and Lakshminaryanan contemplate complete rotation of the source of radiation about the object being scanned. In this regard such CT apparatus are superior in contrast resolution to conventional x-ray apparatus using an x-ray film or TV camera. This improved contrast resolution permits low contrast differences of various organs to be distinguished. Thus in CT apparatus of this type soft tissues of organs can be clearly observed.

However, CT apparatus of this type are inferior in time resolution to conventional x-ray apparatus. Time resolution is determined by how rapidly data necessary for image reconstruction can be obtained. Complete rotation of a source about an object being scanned takes a considerable amount of time and as a consequence artifacts in the resultant images may be caused by motion of the object under observation during such rotation. Accordingly, efforts were directed toward shortening the fan-beam rotation time in order to reduce these artifacts. For example, with reference to FIG. 1 source 10 may be rotated from position Si a total of $\pi$ radians (180 degrees) plus the source fan angle 2a (which is less than 180 degrees) until source 10 reaches a second position Sx. Given this less than 360 degrees of rotation, full detector fan data will not be received for all of detectors 16.

For the geometries illustrated in FIG. 1, only those detectors within arc 18 will receive full detector fan data. Those detectors within arcs 20 will receive partial detector fan data and those detectors within arc 22 will receive no detector fan data. Specifically, with 180 degrees plus source fan angle 2a of rotation of source 10, detector 16i, which is in an incomplete detector fan arc 20, is missing detector fan data which, if source 10 were rotated a full 360 degrees, would be obtained while source 10 rotated from position Sa to position Si.

With 180 degrees plus the source fan angle 2a of rotation, the resultant detector fan data is duplicative for some projections through scan circle 14 and not duplicative for other projections. More specifically, again referring to detector 16i when source 10 is in position Sb a ray of energy 24 would pass through unit volume $X_1$ within scan circle 14 and reach detector 16i. When source 10 is moved to position Sc a ray of energy 26 from source 10 will pass through unit volume $X_1$ and strike detector 16j thereby giving duplicative information for a projection through circle 14 including unit volume $X_1$, assuming no motion occurred.

However, for unit volume $X_2$ detector 16i receives no data for any location of source 10 between positions Si and Sx, rendering the data for such a projection through unit volume $X_2$ nonduplicative and, therefor, distinguishable from the data accumulated for unit volume $X_1$. In other words unit volume $X_1$ has overlapping data to reconstruct a projection of that unit volume, but unit volume $X_2$ has only minimal data. Exact image reconstruction is difficult to obtain without any compensation for such nonuniformity of data sampling within scanning circle 14.

U.S. Pat. No. 4,284,896 issued to Stonestrom teaches the technique to provide nonuniform data compensation in a third generation CT apparatus. In this technique, single entry data is duplicated or reflected to provide overlapping data for all detector fan beams, even though the source fan beam is rotated only 180 degrees plus the source fan angle. Thus all the unit volumes within the scanning circle are sampled by rays as though the source were rotated a full 360 degrees. However, this technique requires excess time to generate the additional data by duplicating or reflecting obtained data. Also errors are likely to occur in the duplication or reflection process.

Another compensation technique for less than 360 degree source rotation is shown in U.S. Pat. No. 4,293,912 issued to Walters. In this technique data for any particular unit volume in the scanning circle is limited to data from projections which range 180 degrees about that unit volume. The rest of the data regarding projections through that unit volume is filtered out prior to convolution and back projection. For example, if unit volume $X_1$ of FIG. 1 were considered, only projections starting from that generated by ray 24 and continuing 180 degrees until the projection obtained from ray 26 might be considered. Any additional projections through unit volume $X_1$ would be disregarded.

This technique, however, is subject to the occurrence of motion artifacts. Although antiparallel but collinear rays, such as rays 24 and 26 in FIG. 1, sample the same projection in scanning circle 14, their data values may be different because of the time difference when they were obtained. Any patient motion during this interval will result in image artifacts. The Walters technique does not allow the possibility of reducing the negative effects of such motion artifacts since redundant data are removed before image reconstruction.

An additional technique is shown in an article by Abraham Naparstek entitled "Short-Scan Fan-Beam Algorithms for CT", IEEE Transactions on Nuclear Science, Volume NS-27, No. 3, June 1980, and in articles by Dennis L. Parker entitled "Optimal Short Scan Convolution Reconstruction For Fanbeam CT", Med. Phys. 9(2), March/April 1982, pages 254–257 and "Optimization of Short Scan Convolution Reconstruction In Fanbeam CT", Department of Radiation Oncology, University of California at San Francisco, 1982, pages 199–202. Naparstek discloses several short-scan reconstruction algorithms of the convolution type for fan-beam projections. Parker demonstrates a reconstruction method for limited angle source rotation as applied to third generation CT apparatus wherein both the source of fan-beam radiation and the detector assembly receiving fan-beam radiation from the source rotate about the object. Parker discloses a weighting scheme which requires that the sum of the two weights corresponding to the same line-integral must equal one in regions for incomplete data collection. Single and double scanning occurs in third generation CT scanners of the type for which the Parker methodology is applicable. However, in third generation CT apparatus each detector fan is itself complete. In fourth generation CT apparatus each detector fan is not necessarily complete.

Moreover, in a fourth generation CT apparatus, in which only the fan-beam radiation source rotates around the object and the detector assembly surrounding the object remains stationary, source fan-beams are usually sorted into detector fan-beams divergent from each element in the detector assembly in order to increase the fan-beam ray density. The fan-beam ray density of a source fan depends on the detector element separation. This quantity is difficult to make small. However, the density of detector fan rays is easily increased by making the angle between source fans small. High density of the fan-beam rays contribute to high spacial resolution of the image.

When a third generation CT apparatus technique is applied to a fourth generation CT apparatus technique, it appears necessary to obtain complete detector fans for 180 degrees plus the detector fan angle. The source rotation required in this case would be 180 degrees plus twice the detector fan angle plus the source fan angle. This increased source rotation would seriously compromise the minimum resolutions time for dynamic CT scans. Furthermore, neither Naparstek nor Parker derive an exact reconstruction method, instead they present only an approximation. In addition, the Naparstek and Parker convolution functions are restricted to a discrete function form. This discrete function has oscilating values instead of even and/or odd arguments. Accordingly, it is difficult to expect such convolution to result in smooth images.

Accordingly, an object of the subject invention is to reduce motion artifacts in a fourth generation CT apparatus while permitting limited source rotation on the order of 180 degrees plus the source fan angle.

A further object of the present invention is to provide a convolution for smoothing the resultant image using an even function to achieve such a result.

In short, the subject invention has as a primary object a new and improved fourth generation CT apparatus which overcomes the above-mentioned problems of the known prior art and provides image reconstruction with a high degree of quality.

Additional objects and advantages of the invention will be set forth in the description which follows, and in part will be obvious from the description or may be learned by practice of the invention.

SUMMARY OF THE INVENTION

To achieve the foregoing objects, and in accordance with the purposes of the invention as embodied and broadly described herein, an apparatus for reconstructing a tomographic image of an object positioned within a scanning circle is provided which comprises: a source of a fan-shaped beam of radiation having a source fan angle of radiation 2a, with this fan-shaped beam being rotatable circumferentially about the scanning circle by an angle of 180 degrees plus the source fan angle 2a; radiation detector means, including a plurality of detector elements surrounding the scanning circle, for detecting radiation in the fan-shaped beam passing from the source through the scanning circle as the source rotates about the scanning circle and for producing, in response to that radiation, source fan data for various positions of the source as the source rotates, with each source fan of data representing the amount of radiation absorbed by a generally fan-shaped region of the object divergent from the source; sort means for sorting the source fans of data into detector fans of data with each detector fan of data representing the amount of radiation absorbed by a generally fan-shaped region of the object divergent from a detector element of the radiation detector means, the detector fans of data including certain detector fans of data which have overlapping data; weighting means for averaging the overlapping data by respective weights; convolution means for performing a convolution of the detector fans of data including data averaged by the weighting means without reordering the detector fan data into parallel ray data to derive convoluted data; memory means; back projection means for back projecting and accumulating the convoluted data into the memory means; and display means for displaying an image in response to the data accumulated in the memory means.

Another aspect of the subject invention focuses on the convolution of the projected data. Convolution functions, in accordance with the subject invention, can be chosen from any one of a number of possibilities. Since the convolution of the subject invention is derived using generalized functions, any approach is available to approximate the ideal convolution kernel with a discrete version. Thus, smoothing filters are effectively included in the teachings of the subject invention.

BRIEF DESCRIPTION OF THE DRAWINGS

The invention may take physical form in certain parts and arrangements of parts, a preferred embodiment of which will be described in detail in this specification and illustrated in the accompanying drawings wherein:

FIG. 3 illustrates the geometry of collected detector fan data and x-ray source fan-beam rotation in order to teach the principles of the subject invention;

FIGS. 4a and 4b illustrate data collection for sampling regions as a function of detector position and source beam position relative to that detector;

DESCRIPTION OF THE PREFERRED EMBODIMENTS

Reference will now be made in detail to the present preferred embodiment of the invention as illustrated in the accompanying drawings.

Figure 2:
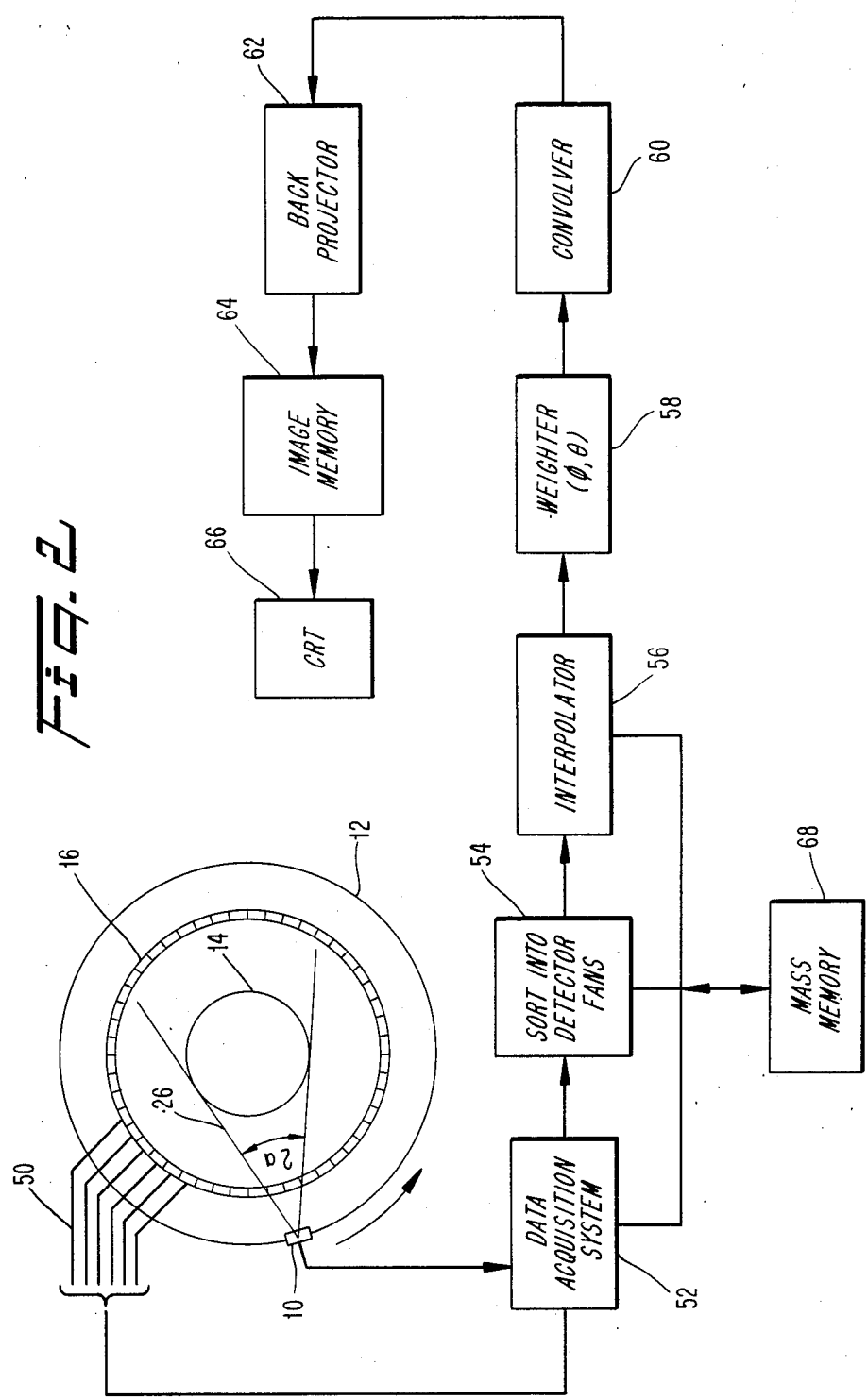
FIG. 2 illustrates a block diagram of a system incorporating the teachings of the present invention.

FIG. 2 illustrates an overall system diagram of the subject invention. Specifically there is illustrated in FIG. 2 source of radiation 10 which rotates about an orbit or circle of rotation 12 and which produces a fan-shaped radiation beam 26; a scanning circle 14; a plurality of detectors 16 which are each connected through a respective line 50 to a data acquisition system 52; sorter 54; interpolator 56; weighter 58; convoluter 60; back projector 62; image memory 64; cathode ray tube display device 66; and memory 68.

Radiation source 10 directs fan-shaped radiation 26 toward scanning circle 14 and partially rotates in a counterclockwise direction around scanning circle 14 an angular distance 180 degrees plus the source fan angle 2a of source 10. The fan-beam radiation 26 may be continuous or pulsed x-ray. The patient which is under observation lies within scanning circle 14 and is thus subjected to fan-shaped beam 26 as source 10 rotates.

Detectors 16 are located around a ring which has a smaller diameter than circle of rotation 12 of radiation source 10. The ring upon which detectors 16 are located nutates so that the angular segment of the detector ring which is located nearest the source does not interrupt the projection of fan-beam 26 from source 10 onto the patient within scanning circle 14.

The radiation which passes from source 10 through the patient within scanning circle 14, that is radiation which has not been absorbed or scattered by the patient, is received by that arc of detectors 16 which is located opposite source 10. 1024 detectors 16 may, for example, by formed in a ring about scanning circle 14. Each detector 16 may consist of a scintillation crystal such as $CdWO_4$, $ZnWO_4$, or the like which operates to convert incident radiation into visible light, and a photodiode to convert that visible light into an electrical analog signal. These analog signals are gathered by data acquisition system (DAS) 52 through lines 50. DAS 52 converts analog signals from detectors 16 into digital form and takes the log of these signals. In addition, DAS 52 compensates for differences in the sensitivity of detectors 16.

The digital signal from DAS 52 represents divergent ray projected data integrated along each ray of fan beam 26 from source 10 to a detector 16. Sorter 54 sorts or bins this divergent ray projected data from source fan form format into detector fan format. The output of sorter 54 is coupled to the input of interpolator 56 which produces equi-angular spread projection data for each detector 16. This interpolation is necessary since the source produces equi-angular ray intervals for the center of scanning circle 14 but not for any particular detector 16.

Mass memory 68 acts as a tempory storage area for DAS 52, sorter 54 and interpolator 56.

As will be explained in more detail below, the output of interpolator 56 is coupled to a weighting circuit 58 which multiplies the projected data for certain regions derived by interpolator 56 by a particular weighting function. The output of weighter 58 is coupled to convoluter 60. Convoluter 60 performs convolution on the weighted projection data. As will also be explained below the convolution function utilized in convoluter 60 is objected as a convolution of a generalized function and of a smoothing function. As a consequence smooth convoluted projected data is obtained from convoluter 60 and supplied to back projector 62. Back projector 62 projects this smoothly convoluted projection data into image memory 64 for each detector fan which is derived from each detector 16. The data accumulated in image memory 64 is then projected or displayed on cathode ray tube 66. A more detailed explanation of the weighting, convolution and back projection operations follows.

Figure 1:
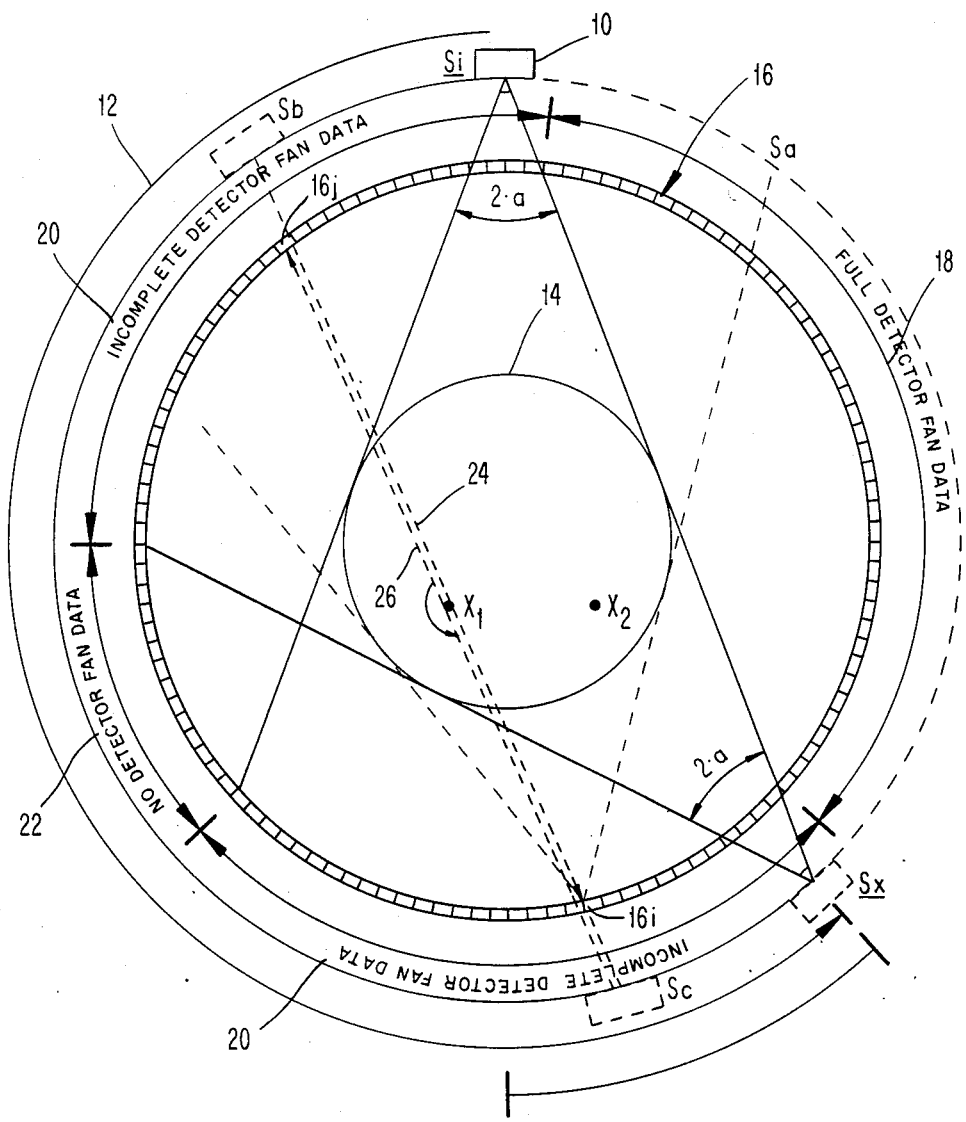
FIG. 1 illustrates the geometry of source fans which rotate through 180 degrees plus the source fan angle.

FIG. 3 shows a schematic diagram illustrating the geometric relationships between the position of source 10 rotating about orbit 12 and the ring of detectors 16 which surrounds scanning circle 14. As was noted above in connection with FIG. 1 source 10 provides a fan-shaped beam 26 having a divergent source angle of 2a. Source 10 rotates in a counterclockwise direction from position Si to position Sx. This rotation occurs along orbit 12 which is a portion of a circle having a center O and a radius L. The angle Si·O·Sx is 180 degrees plus the source fan angle 2a.

Detectors 16 form a ring having a radius S and a center O. The detector 16 located furthest from source 10 for any given location of source 10 receives the center ray of the fan-shaped radiation 26 from source 10. For example, if source 10 were in position Sc shown in FIG. 3, radiation from the center ray of source 10 would strike detector 16c. Moreover, when source 10 was in position Si, detector 16c would receive radiation from the extreme lefthand ray of fan-shaped beam 26 (as seen from source 10). Similarly when source 10 was in position Sd, source 16c would receive radiation from the extreme righthand ray of fan 26 (as seen from source 10). Accordingly, each detector element 16 receives data from a detector fan-beam 30 which encircles scanning circle 16 and which detector fan-beam has an angle 2p, the angle 2p being hereinafter referred to as the "detector fan angle".

In FIG. 3 the angular location of the central ray of radiation from source 10 is denoted by the angle $\theta$. Angle $\theta$ equals zero when source 10 is located in the position Si. For the limited source rotation of 180 degrees plus the source fan angle 2a, data will be accumulated by detectors covering an angular range from +p−a degrees to 180+p+3a degrees (assuming the source fan and data fan angles to be measured in degrees. In certain equations given below these angles are assumed to be measured in radians, as would be obvious to one skilled in the art.) Accordingly an arc of 180+2p+4a degrees of the ring of detectors 16 is utilized.

Each detector element 16 on the arc from −p−a degrees to +p+a degrees produces incomplete detector fans because source 10 does not rotate a full 360 degrees. An incomplete detector fan refers to a detector fan of data which does not fully encompass scanning circle 14.

The detectors 16 on the arc from +p+a degrees to 180−p+a degrees produce complete fans, while the detectors 16 on the arc from 180−p+a degrees to 180+p+3a degrees also produce incomplete fans. The detectors on the arc from 180+p+3a degrees to −p−a degrees contain no data.

FIGS. 4a and 4b illustrate the above relationships. Specifically, in FIG. 4a, a center beam of radiation from source 10 in position Sc is shown passing through center O of scan circle 14 and striking detector 16c. The position of detector 16c is defined by angle $\theta$, that is the angle which the center beam from source 10 makes with the projection of the center beam or ray from source 10 when source 10 is in original position Si. In the illustrated position of FIG. 4a, detector 16 lies at an angle $\theta$ which is greater than +p+a degrees and less than 180−p+a degrees.

As was mentioned above each of detectors 16 has a detector fan illustrated by detector fan 30 in FIG. 4a. A particular location of any projection through detector fan 30 by the central ray of source 10 is defined by an angle $\phi$. Angle $\phi$ is the angle a projection within fan-beam 30 makes with the projection which passes through the center O of scanning circle 14. Accordingly, angle $\phi$ ranges between +p and −p degrees.

In FIG. 4b a graph is shown in which the horizontal axis represents the location of a detector 16 in terms of angle $\theta$ and the vertical axis represents the position of the projections within each detector fan for detector 16 as a function of $\phi$. Beginning at the detector located at position $\theta = +p+a$ degrees, complete projection data is available for all angles of $\phi$ ranging from +p to −p. This condition of full projection data continues for all detectors between $\theta = +p+a$ degrees and $\theta = 180-p+a$ degrees. For detectors between −p−a degrees and +p+a degrees, and for detectors between 180−p+a degrees and 180+p+3a degrees there is partial projection data.

Moreover the projection data within region ABF of FIG. 4b overlaps with the projection data within region CED. As used herein, the term "projection data" (Pd) refers to that data received by a particular detector as a result of the projection of a ray from source 10. Accordingly, each element of projection data (Pd) for a particular detector fan-beam may be defined as a function of $\phi$ and $\theta$ (Pd($\phi$, $\theta$)). Accordingly, the projection data Pd ($\phi$, $\theta$) within the region ABF overlaps with the respective projection data Pd ($-\phi$, $\theta+180+2\phi$) within the region CED.

The boundaries of these regions are defined by $\theta = L_1(\phi)$ for line AB, $\theta = L_2(\phi)$ for line CD, $\theta = L_3(\phi)$ for line AF, and $\theta = L_4(\phi)$ for line CE where:

$$L_1(\phi) = \phi + \arcsin(S \cdot \sin(\phi/L)) \tag{1}$$

$$L_2(\phi) = \pi + 2a + \phi + \arcsin(S \cdot \sin(\phi/L)) \tag{2}$$

$$L_3(\phi) = \phi - \arcsin(S \cdot \sin(\phi/L)) + 2a \tag{3}$$

$$L_4(\phi) = \phi + \pi - \arcsin(S \cdot \sin(\phi/L)) \tag{4}$$

In accordance with the teachings of the subject invention, a weighting circuit is provided which multiplies the projection data of overlapping regions derived from an interpolator by a weighting function. Specifically, in the disclosed embodiment weight circuit 58 of FIG. 2 multiplies the projection data from interpolator 56 for overlapping region ABF and CED by a particular weighting function (W) which is dependent upon $\phi$ and $\theta$ (W ($\phi$, $\theta$)). Weighting function W ($\phi$, $\theta$) satisfies the following relationship:

$$W(\phi, \theta) + W(-\phi, \theta + \pi + 2\phi) = 1 \tag{5}$$

where $$W(\phi, \theta) \neq 0 \text{ or } 1,$$

when $$(\phi, \theta) \in \{ABF \text{ or } CED\},$$

and $$W(\phi, \theta) = 0 \text{ or } 1$$

when $$(\phi, \theta) \notin \{ABF \text{ or } CED\}.$$

This equation (5) means that overlapping projection data from both regions ABF and CED contribute to the resultant image with the same weight that other data does.

In accordance with a preferred embodiment weighting function W ($\phi$, $\theta$) may take on the following characteristics:

EXAMPLE 1

$$W(\phi,\theta) = 0 \text{ when } \phi < L_1(\phi); \tag{6}$$

$$= 3 \cdot \left( \frac{\theta - L_1(\phi)}{L_3(\phi) - L_1(\phi)} \right)^2 -$$

$$2 \cdot \left( \frac{\theta - L_1(\phi)}{L_3(\phi) - L_1(\phi)} \right)^3 \text{ when } L_1(\phi) \leq \theta < L_3(\phi);$$

$$= 1 \text{ when } L_3(\phi) \leq \theta < L_4(\phi);$$

$$= 3 \cdot \left( \frac{L_2(\phi) - \theta}{L_2(\phi) - L_4(\phi)} \right)^2 -$$

$$2 \cdot \left( \frac{L_2(\phi) - \theta}{L_2(\phi) - L_4(\phi)} \right)^3 \text{ when } L_4(\phi) \leq \theta \leq L_2(\phi); \text{ and}$$

$$= 0 \text{ when } \theta > L_2(\phi).$$

EXAMPLE 2

$W(\theta,\phi) = 0$ when $\theta < L_1(\phi)$;  (7)

$= \dfrac{\theta - L_1(\phi)}{L_3(\phi) - L_1(\phi)}$ when $L_1(\phi) \leq \theta < L_3(\phi)$;

$= 1$ when $L_3(\phi) \leq \theta < L_4(\phi)$;

$= \dfrac{L_2(\phi) - \theta}{L_2(\phi) - L_4(\phi)}$ when $L_4(\phi) \leq \theta < L_2(\phi)$; and $= 0$ when $\theta > L_2(\phi)$.

Weighted projected data from weight circuit 58 is supplied to convoluter 60 as shown in FIG. 2. Convoluter 60 performs convolution of the weighted projection data sorted into detector fans. Absent data elements of incomplete detector fans are recognized as "zero".

The convolution function is provided as the convolution of the generalized function hd ($\phi$) with some smoothing functions s($\phi$)

The generalized function hd ($\phi$) satisfies the following relationships:

$hd(\phi) = -1/\pi\sin^2\phi$ if $\phi \neq 0$  (i)

$\int_{-\pi/2}^{\pi/2} hd(\phi)d\phi = 0$  (ii)

One example of the smoothing function s($\phi$) is given as follow:

$s(\phi) = 1/\Delta\phi$ if $|\phi| < \Delta\phi/2$  (8)

$= \tfrac{1}{2}\Delta\phi$ if $|\phi| = \Delta\phi/2$ $= 0$ if $|\phi| > \Delta\phi/2$ The smoothing function s($\phi$) filters out high frequency components of the projection data and must simply be an even function.

The convolution function h($\phi$) given below is obtained as a convolution of the generalized function and the smoothing function:

$h(m\Delta\phi) = 1/(\pi\Delta\phi)\cdot[\cot(m+\tfrac{1}{2})\Delta\phi - \cot(m-\tfrac{1}{2})\Delta\phi]$  (9)

This function "h" is smooth, and does not oscillate if m is even or odd.

The smoothly convolved projection data from convolver 60 is supplied to back projector 62. Back projection 62 back-projects the smoothly convolved projection data into image memory 64 corresponding to the location of the data in relation to the scanning circle. This convolution and back-projection operation is repeated for the projection data sorted into the detector fans which is derived from each detector element over an angular range from $-p-a$ degrees to $180+p+3a$ degrees shown in FIG. 4a. Data accumulated in image memory 64 may then be displayed on CRT 66.

Figure 5:
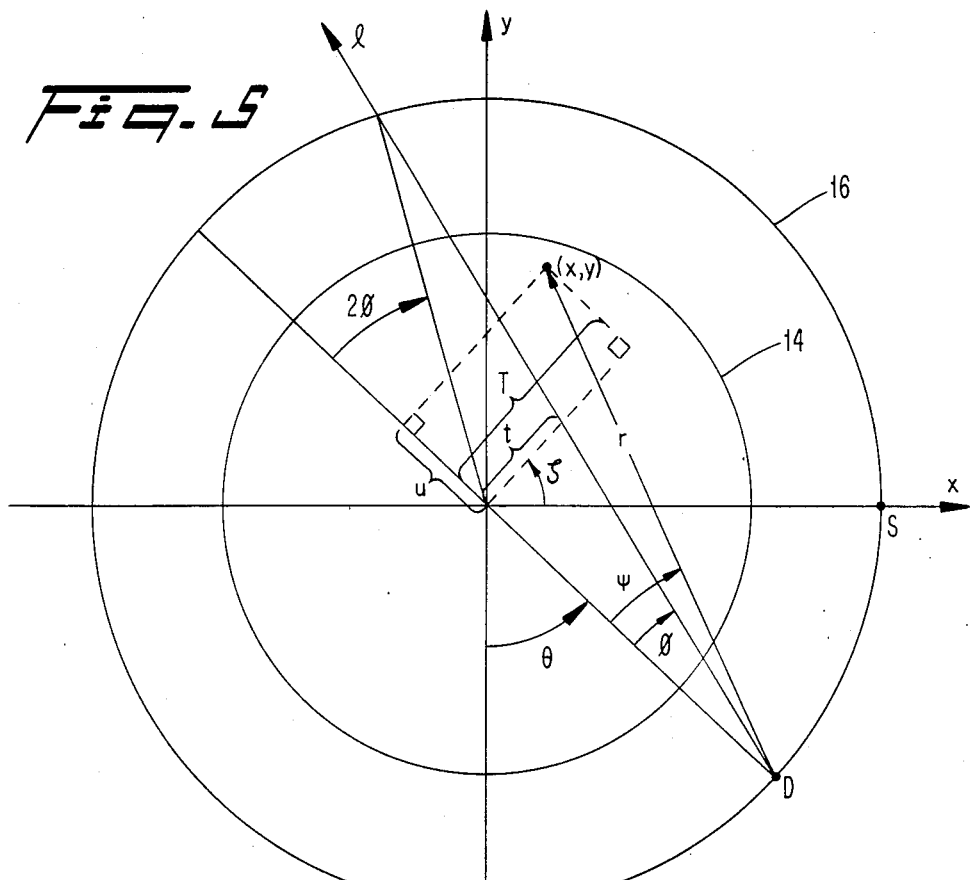
FIG. 5 is a geometric illustration showing conversion between polar and Cartesian coordinate systems.

The value of each pixel of the image memory 64 may be defined as a function f(x,y) in the Cartesian coordinate system. FIG. 5 shows a Cartesian coordinate system view of scanning circle 14 and detector ring 16, with a particular detector element D indicated. This function f(x,y) is obtained as follow:

$$f(x,y) = (\tfrac{1}{2}\pi)\int_{-p-a}^{\pi+p+3a}\left(\dfrac{1}{r^2}\right)\cdot\int_{-p}^{p}W(\phi,\theta)Pd(\phi,\theta)\cdot h(\psi-\phi)\cdot(S\cdot\cos\phi)d\phi d\theta$$  (10)

where $r^2 = (x - S\cdot\sin\theta)^2 + (y + S\cdot\cos\theta)^2$ $\psi = -\pi/2 + \arctan\dfrac{y + S\cdot\cos\theta}{-x + S\cdot\sin\theta} + \theta$ so that $\hat{\rho}(\phi,\theta) = \int_{-p}^{p} W(\phi,\theta)Pd(\phi,\theta)h(\psi - \phi)S\cdot\cos\phi d\phi$ (convolution)

$f(x,y) = (\tfrac{1}{2}\pi)\int_{-p-a}^{\pi+p+3a}\left(\dfrac{1}{r^2}\right)\cdot\hat{\rho}(\psi,\theta)d\theta$ (back projection)

The weighting function W($\phi$, $\theta$) is, for example, equation (6) or (7). The convolution function h($\phi$, $\theta$) is, for example, equation (9). The function Pd($\phi$, $\theta$) is the projection data sorted into a detector fan and interpolated into equi-angular data rays for each detector element. The factor $S\cdot\cos\phi/r^2$ is the Jacobian of the transformation.

It is desirable to compute $W(\phi, \theta)\cdot Pd(\phi, \theta)\cdot(S\cdot\cos\phi)$ prior to computing h($\Psi$, $\phi$) to make the computation easy.

The weight circuit 58, convolver 60 and back projector 62 perform the computation of equation (10) as follows:

$f(x,y) = (\tfrac{1}{2}\pi)\sum_{k=M_1}^{M_2}\dfrac{1}{r^2}\sum_{i=-N}^{N} W(i\Delta\phi,k\Delta\theta)Pd(i\Delta\phi,k\Delta\theta)\cdot h((i-j)\Delta\phi)(S\cdot\cos\Delta\phi i)\Delta\phi\Delta\theta$ where $M_1\cdot\Delta\theta = -p - a$ $M_2\cdot\Delta\theta = \pi + p + 3a$ $N\Delta\phi = p$ $r^2 = (x - S\cdot\sin k\Delta\theta)^2 + (y + S\cos k\Delta\theta)^2$ $j\Delta\theta = -\pi/2 + \arctan\dfrac{y + S\cdot\cos\cdot k\Delta\theta}{-x + S\sin\cdot k} + k\Delta\theta$ so that $\hat{\rho}(\psi,\theta) = \sum_{i=-N}^{N} W(i\Delta\phi,k\Delta\theta)Pd(i\Delta\phi,k\Delta\theta)\cdot h((i-j)\Delta\phi)\cdot S\cdot\cos\Delta\phi$ (convolution)

$f(x,y) = \tfrac{1}{2}\pi\sum_{k=M_1}^{M_2}\left(\dfrac{1}{r^2}\right)\hat{\rho}(\phi,\theta)\Delta\theta$ (back projection)

In the present invention the convolution function can utilize a function, like the equation (9), representative of the approximation of the generalized function hd($\phi$). Furthermore this approximation is given by the convolution of the generalized function Pd($\phi$) and a smoothing function like equation (8). The convolution function, according to the present invention, is a continuous function or its discrete implementation, either of which can be chosen for appropriate image smoothing.

MATHEMATICAL DERIVATION

This mathematical derivation will provide a proof of the validity of the weighting method described by equation (10).

1. Introduction

Both parallel and divergent ray coordinate variables are demonstrated in FIG. 5. Location (x,y) of FIG. 5 is some arbitrary reconstruction point while ($\xi$,t) and ($\theta$,$\phi$) specify the view and ray locations in the parallel and divergent coordinates, respectively. Important relations are:

$$r^2 = (x - S \cdot \sin\theta)^2 + (y + S \cdot \cos\theta)^2 \quad (11)$$

$$\psi = -\pi/2 + \theta + \arctan\frac{y + S \cdot \cos\theta}{-x + S \cdot \sin\theta}$$

$$t = S \cdot \sin\phi$$
$$\zeta = \theta - \phi$$

$$\begin{pmatrix} T \\ u \end{pmatrix} = \begin{pmatrix} \cos\zeta & \sin\zeta \\ -\sin\zeta & \cos\zeta \end{pmatrix} \begin{pmatrix} x \\ y \end{pmatrix}$$

A datum along line 1 in FIG. 5 is written as Pd ($\theta$,$\phi$) in divergent fan coordinates or Pp($\xi$,t) in parallel beam coordinates. The only assumptions made concerning the projection data Pd($\theta$,$\phi$) or Pp ($\xi$, t) is that this data is single valued and is zero outside the detector ring radius. That is:

$$Pd(\theta,\phi) = Pd(\theta + 2\pi,\phi) \quad (12)$$
$$= Pd(\theta,\phi + \pi)$$
$$= Pp(\zeta,t)$$
$$= Pp(\zeta + 2\pi,t)$$

and $Pp(\zeta,t) = 0$ if $|t| \geq S$

Thus Pd($\theta$,$\phi$) and Pp($\xi$,t) can be viewed as not only a projection data set of an object, but also simply as functions satisfying equation (12); namely $\theta$ has a period of $2\pi$, $\phi$ has a period of $\pi$, and $\xi$ has a period of $2\pi$.

The "ordinary parallel reconstruction method" is defined as follows: for every function 'p($\xi$,t)', 'h(x)', $$\mathbb{P}p[p;h](x,y) = 1/(2\pi) \int_{-\pi}^{\pi} \int_{-\infty}^{\infty} p(\zeta,t)h(T - t)dtd\zeta \quad (13)$$

and "parallel projection" is given as:

$$\mathbb{P}p[f](\zeta,t) = p(\zeta,t) = \int_{-\sqrt{s^2 - t^2}}^{\sqrt{s^2 - t^2}} f(x,y)dU. \quad (14)$$

The "ideal kernel (for the parallel beam reconstruction method)" 'hp' is defined as $$F[hp] = \Omega \quad (15)$$

where 'F' is the Fourier transform, i.e., $$F[f] = \int_{-\infty}^{\infty} f(x)\exp(-i\Omega x)dx. \quad (16)$$

Theorem 1 (properties of the ideal kernel for parallel method)

The hp(x) is a generalized function (distribution) and satisfies the following relationships:

$$\forall x \neq 0; hp(x) = \frac{-1}{\pi x^2} \quad (17)$$

$$\int_{-\infty}^{\infty} hp(x)dx = 0 \quad (18)$$

This generalized function hp(x) is even and has a singular point at x=0.

Theorem 2 (reconstruction theorem of parallel method)

The reconstruction theorem of the parallel method is represented by the following expression:

$$f(x,y) = \mathbb{P}p[\tfrac{1}{2}\mathbb{R}[f]](x,y)$$

where $$x^2 + y^2 < S^2 \quad (19)$$

"Divergent projection" is similarly defined as:

$$\mathbb{P}d[f](\theta,\phi) = \mathbb{P}p[f](\xi,t) \quad (20)$$

where from FIG. 5:

$$\xi = \theta - \phi$$
$$t = S \cdot \sin\phi$$

Obviously, operators "$\mathbb{P}p$", "$\mathbb{P}d$" and "$\mathbb{R}p$" are linear.

2. Extension of Parallel Method

An "extended" parallel reconstruction method is now introduced to include modulation of the projection data Pp($\xi$,t) with coordinate dependent weights W($\xi$,t). In this case we define the reconstruction procedure as:

$$\mathbb{R}p[W \cdot P] = 1/(2\pi) \int_{-\pi}^{\pi} \int_{-\infty}^{\infty} w(\zeta,t)p(\zeta,t)h(T - t)dtd\zeta \quad (21)$$

The equivalency of the "extended" reconstruction represented by equation (21) and the normal parallel reconstruction represented by equation (19) is now demonstrated.

Theorem 3 (extension theorem on parallel method)

$$\forall_x \forall_y (x^2 = y^2 < S^2) \rightarrow \mathbb{R}p[Wp.Pp; h](x,y) = \mathbb{R}p[(\tfrac{1}{2})Pp; h](x,y) \quad (22)$$

Equation (22) will be valid under the following assumptions:

(1) Pp satisfies equations (12),
(2)

$$Pp(\xi,t) = Pp(\xi + \pi, -t) \quad (23)$$

(3) Wp is a function such that $$\forall \forall \xi \ t(|t|<S) \to Wp(\xi,t) = 1 - Wp(\xi+\pi,-t) = Wp(\xi+2\pi,t) \quad (24)$$

(4) h(x) is an even function i.e., $$h(x) = h(-x) \quad (25)$$

Obviously projection data satisfies assumption (23). The remaining assumptions impose only weak constraints on the weighting and convolution functions. Equation (24) assumes that Wp has a period of $2\pi$ and that the summation of Wp($\xi$,t) and Wp($\xi+\pi,-t$) is 1. The weights Wp are thus only required to remove the data redundancy.

Proof of Theorem 3

Since 'Pp' satisfies equation (12), for every x,y such that $x^2+y^2<S^2$, Rp[($\frac{1}{2}$)Pp; h] may be rewritten from equation (13) as follows:

$$\mathbf{R} p[(1/2)Pp;\ h]$$

$$= 1/(4\pi) \int_{-\pi}^{\pi} \int_{-\sqrt{S^2-t^2}}^{\sqrt{S^2-t^2}} ((1 - Wp(\zeta,t)) + Wp(\zeta,t))Pp(\zeta,t)h(T-t)dtd\zeta$$

$$= 1/2\,\mathbf{R} p[Wp\ Pp;\ h] + I$$

where $$I = 1/(4\pi) \int_{-\pi}^{\pi} \int_{-\sqrt{S^2-t^2}}^{\sqrt{S^2-t^2}} (1 - Wp(\zeta,t))Pp(\zeta,t)h(T-t)dtd\zeta.$$

Consider now the transformation to reflected coordinates s', t' where:

$$\xi' = \xi+\pi,\ t' = -t,\ T = x\cos\xi' + y\sin\xi'.$$

Thus, $$T' = -T$$

$$1 - Wp(\xi,t) = Wp(\xi',t')$$

$$Pp(\xi,t) = Pp(\xi',t')$$

$$h(T-t) = h(T'-t')$$

With this change of variables I becomes:

$$I = 1/(4\pi) \int_{-\pi}^{\pi} \int_{-\sqrt{S^2-T^2}}^{\sqrt{S^2-T^2}} Wp(\zeta',t')Pp(\zeta',t')h(T'-t')dt'd\zeta'$$

$$= 1/2\,\mathbf{R} p[Wp\ Pp;\ h]$$

and thus $$\mathbf{R} p[(\tfrac{1}{2}Pp;\ h] = \mathbf{R} p[Wp\cdot Pp;\ h]$$

In particular the case in which Wp=$\frac{1}{2}$ is the ordinary parallel method. This theorem relaxes the condition of ordinary parallel reconstruction. We reiterate that this theorem requires only the very weak assumptions:
'h': every even function
'Wp': every function satisifes equation (24)

Corollary 3-1 (ordinary parallel beam reconstruction method with 180 degree scan).

Assume 'Pp' satisfies equations (12) and (23), let 'W' be a function defined as:

$$\forall \xi < [-\pi \geq \xi \geq \pi]:\ W(\xi,t) = 1$$

if $$-\pi/2 \geq \xi \geq \pi/2\ W(\xi,t) = 0$$

otherwise $$W(\xi,t) = W(\xi+2\pi,t) \quad (26)$$

This 'W' satisfies the conditions of equation (24), thus for every even function 'h':

$$\mathbf{R} p[(1/2)Pp;\ h] = \mathbf{R} p[W\cdot Pp;\ h] \quad (27)$$

$$= 1/(2\pi) \int_{-\pi/2}^{\pi/2} \int_{-\infty}^{\infty} Pp(\zeta,t)h(T-t)dtd\zeta$$

Corollary 3-2 (extended parallel beam reconstruction method)

When 'W' satisfies the condition of equation (24):

$$\forall x\ \forall y(x^2+y^2<S^2) \to f(x,y) = \mathbf{R} p[W\cdot Pp[f];\ hp](x,y) \quad (28)$$

3. Derivation of Extended Divergent Method

In this section, an "extended" divergent method is introduced corresponding to the "extended" parallel beam reconstruction method defined in the last section.

The "extended" divergent method" is defined as follows: for every function 'W','p', 'h'

$$\mathbf{R} d[W\cdot p;\ h](x,y) = \quad (29)$$

$$1/(2\pi) \int_{-\pi}^{\pi} \left(\frac{S}{r^2}\right) \cdot \int_{-\frac{\pi}{2}}^{\frac{\pi}{2}} W_d(\theta,\phi)P_d(\theta,\phi)h_d(\psi - \phi)\cos\phi d\phi d\theta$$

The "ideal" kernel for the divergent beam reconstruction method 'hd' is given as $$hd(\phi) = hp(\sin\phi) \quad (30)$$

Theorem 4 (equivalency of the divergent beam reconstruction method and the parallel beam reconstruction method)

When 'Wp' is a function satisfying equation (24), and 'Pp' satisfies equation (12), then $$\forall x\ \forall y(x^2+y^2<S^2) \to \mathbf{R} p[Wp\cdot Pp;\ hp](x,y) = \mathbf{R} d[Wd\ Pd;\ hd](w,y) \quad (31)$$

where
$t = S\cdot\sin\phi,$
$\xi = \theta - \phi$ $$Wp(\xi,t) = Wd(\theta,\phi),\ Pp(\xi,t) = Pd(\theta,\phi) \quad (32)$$

Proof of Theorem 4

Some lemmas are first established in preparation for the proof of Theorem 4.

Lemma 4-1:

When 'Wp' satisfies equation (24) and 'Pp' satisfies equation (12), $$\forall x \forall y \, (x^2 + y^2 < S^2 \longrightarrow \quad (33)$$

$$R_p[Wp \cdot Pp; h] =$$

$$1/(2\pi) \int_{-\pi}^{\pi} \int_{-\frac{\pi}{2}}^{\frac{\pi}{2}} Wd(\theta,\phi)Pd(\theta,\phi)h(r \cdot \sin(\psi -$$

$$\phi)S \cdot \cos\phi d\phi d\theta$$

This equation (33) is obtained by converting $(\xi, t)$ into $(\theta, \phi)$ and by using equation (32).

Lemma 4-2:

By using theorem 3, equation (17) and the definition of 'hd' given by equation (30), the following relationship is obtained:

$$hp(r \cdot \sin x) = hd(x)/r^2 \text{ for arbitrary } r \neq 0 \quad (34)$$

Now, the Proof of Theorem 4 follows:

$$x^2 + y^2 < S^2$$

so, $$r > 0.$$

Using Lemma 4-2, $$hp(r \cdot \sin(\Psi - \phi)) = hd(\Psi - \phi)/r^2$$

Substituting this result into equation (33), we get $$R_p[Wp \cdot Pp; hp]$$

$$= 1/(2\pi) \int_{-\pi}^{\pi} \int_{-\frac{\pi}{2}}^{\frac{\pi}{2}} Wd(\theta,\phi)Pd(\theta,\phi)hd(\psi -$$

$$\phi)S \cdot \cos\phi/r^2 d\phi d\theta$$

$$= R_d[Wd \cdot Pd; hd].$$

This theorem assures that the extended divergent beam reconstruction method is equal to the extended parallel beam reconstruction method only when the kernel is 'hd'. We can derive a equation like (33) for every coordinate system, but in lemma 4-2, we had to use a property of 'hd' itself to separate 'r' from the kernel.

Theorem 5 (extended divergent beam reconstruction method)

$$f(x,y) = R_d[W \cdot Pd[f]; hd](x,y) \quad (35)$$

if $X^2 + y^2 < S^2$.

We assume that 'W' is a function such that:

$$W(\theta,\phi) = W(\theta + 2\pi, \phi) = W(\theta, \phi + \pi) = 1 - W(\theta + \pi + 2\phi, -\phi). \quad (36)$$

This assumption indicates that $W(\theta,\phi)$ has a period of $2\pi$ with respect $\theta$ and $\pi$ with respect to $\phi$, and that the summation of $W(\theta,\phi)$ and its reflection $W(\theta + \pi + 2\phi, -\phi)$ is 1 (see FIG. 5). This is the same relation as equation (24). The proof is complete from Corollary 3-2 and Theorem 4.

A direct analogy to the parallel beam result given in equation (22) may now be made. Since 'W' satisfies equation (26), 'Pd' satisfies equation (12) and $$Pd(\theta,\phi) = Pd(\theta + \pi + 2\phi, -\phi) \quad (37)$$

$$R_d[W \cdot Pd; hd] = R_d[(1/2)Pd; hd] \quad (38)$$

$$= 1/(4\pi) \int_{-\pi}^{\pi} (S/r^2) \cdot \int_{-\frac{\pi}{2}}^{\frac{\pi}{2}} Pd(\theta,\phi)hd(\psi - \phi)\cos\phi d\phi d\theta$$

This is the divergent beam reconstruction in which the source rotates a full 360 degrees. The result of equation (38) simply indicates that reconstruction obtained by employing the weights W and less than 360 degree rotation will differ only by a scale factor of ½ from those obtained from the normal 360 degree rotation divergent beam reconstruction method.

Corollary 5-2 (the present invention method)

Figure 6:
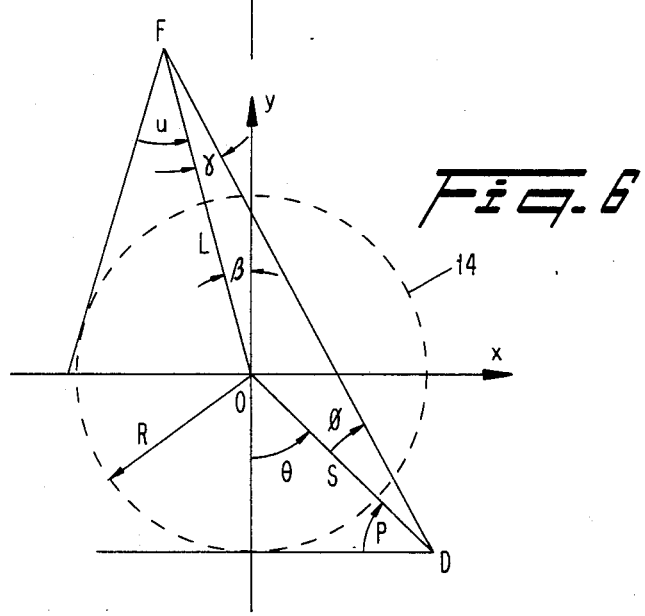
FIG. 6 is a geometric illustration showing another conversion between polar and Cartesian coordinates.

In FIG. 6 the source and detector elements are respectively represented as F and D. Variables are defined as shown in FIG. 6. It is apparent from FIG. 6 that:

$$L \cdot \sin \gamma = S \cdot \sin \phi - P + \theta = \gamma + \phi \quad (39)$$

and $$f(x,y) = 0 \text{ when } x_+^2 y^2 > R^2 \quad (40)$$

For a source rotation of $\beta = 0$ to $\pi + 2a$, the detector fan data collected is shown as region A B C D in FIG. 4.

Let "Wh" be a function satisfying equation (39) and:

$$Wh(\theta,\phi) = 1 \text{ if } (\theta,\phi) \in A F C E \quad (41)$$

$$= 0 \text{ if } (\theta,\phi) \notin A B C D$$

$$\neq \text{ neither 1 or 0 otherwise}$$

This 'Wh' satisfies the condition of Theorem 5, so we can reconstruct 'Wh·Pd' with the extended divergent beam reconstruction method.

Note that since Wh Pd=0 outside of the area A B C D, we require the values of 'Pd' only inside of this parallelogram.

Therefore:

$$f(x,y) = (1/2\pi) \int_{-p-a}^{\pi+p+3a} \left(\frac{1}{r^2}\right) \cdot \quad (42)$$

$$\int_{-P}^{P} Wh(\phi,\theta)Pd(\phi,\theta)hd(\psi - \phi)(S \cdot \cos\phi)d\phi d\theta$$

The projection data within the overlapping regions ABF and CFD are averaged with a desired weighting function 'Wh' to reduce the motion artifact.

Furthermore, it is preferable that the generalized function 'hd' be convolved with a desired smoothing function to obtain an approximation 'h' for a practical computation.

Additional advantages and modifications will readily occur to those skilled in the art. The invention in its broader aspects is, therefore, not limited to the specific details, representative apparatus and illustrative examples shown and described. Accordingly, departures may be made from such details without department from the spirit or scope of applicant's general inventive concept.

We claim:

1. An apparatus for reconstructing a tomographic image of an object positioned within a scanning circle comprising:

a source of a fan-shaped beam of radiation having an angle of radiation 2a, said fan-shaped beam rotatable circumferentially about said scanning circle by an angle of $\pi$ plus 2a;

radiation detection means, including a plurality of detector elements surrounding said scanning circle, for detecting radiation in said beam passing from said source through said scanning circle as said source rotates about said scanning circle, and for producing, in response to said radiation, a source fan set of data for various positions of said source as said source rotates, each said source fan set of data representing the amount of radiation absorbed by a generally fan-shaped region of said object divergent from said source;

sort means for sorting said source fan sets of data into detector fan sets of data, each said detector fan set of data representing the amount of radiation absorbed by a generally fan-shaped region of said object divergent from a detector element of said radiation detector means, said detector fan sets of data including certain sets which have overlapping data;

weighting means for weighting said overlapping data by a smooth function which is complementary in value to said overlapped data sets;

convoluter means for performing a convolution of said detector fan sets of data including data weighted by said weighting means without reordering said detector fan data into parallel ray data to derive convoluted data;

memory means;

back projector means for back projecting and accumulating said convoluted data into said memory means; and display means for displaying an image in response to said data accumulated in said memory means.

2. The apparatus according to claim 1 wherein one of said weights is given as the following:

$W(\phi,\theta) = 0$ when $\theta < L1(\phi)$;

$= 3 \cdot \left( \dfrac{\theta - L1(\phi)}{L3(\phi) - L1(\phi)} \right)^2 - 2 \cdot \left( \dfrac{\theta - L1(\phi)}{L3(\phi) - L1(\phi)} \right)^3$ when $L1(\phi) \leq \theta < L3(\phi)$;

$= 1$ when $L3(\phi) \leq \theta < L4(\phi)$;

$= 3 \cdot \left( \dfrac{L2\phi - \theta}{L2(\phi) - L4(\phi)} \right)^2 - 2 \cdot \left( \dfrac{L2(\phi) - \theta}{L2(\phi) - L4(\phi)} \right)^3$ when $L4(\phi) \leq \theta \leq L2(\ )$; and $= 0$ when $\theta > L2(\phi)$ and $W(\phi,\theta) = 1 - W(-\phi, \theta + \pi\, 2\phi)$ where $L1(\phi) = \phi + \arcsin(S \cdot \sin\phi/L)$;

$L2(\phi) = \pi + 2a + \phi + \arcsin(S \cdot \sin\phi/L)$;

$L3(\phi) = \phi - \arcsin(S \cdot \sin\phi/L) + 2a$; and $L4(\phi) = \phi + \pi - \arcsin(S \cdot \sin\phi/L)$; $\phi$ is the angular orientation of a ray in the detector fan; $\theta$ is the angular orientation of the detector elements; "a" is one half the source fan angle; L is the distance between the center of the circle and the source; and S is the distance between the center and the detector elements.

3. An apparatus for reconstructing a tomographic image of an object positioned within a scanning circle comprising:

a source of a fan-shaped beam of radiation having an angle of radiation 2a, said fan-shaped beam rotatable circumferentially about said scanning circle by an angle of $\pi$ plus 2a;

radiation detector means including a plurality of detector elements surrounding said scanning circle for detecting radiation in said beam passing from said source through said scanning circle as said source rotates about said scanning circle and for producing in response to said radiation a source fan set of data for each of various positions of said source as said source rotates, each said source fan set of data representing the amount of radiation absorbed by a generally fan-shaped region of said object divergent from said source;

sort means for sorting said source fan sets of data into detector fan sets of data, each said detector fan set of data representing the amount of radiation absorbed by a generally fan-shaped region of said object divergent from a detector element of said radiation detector means, said detector fan sets of data including certain sets which have overlapping data;

weight means for weighting said overlapping data by a smooth function which is complementary in value to said overlapped data sets;

convoluter means for convoluting said detector fan sets with a non-oscillating convolution function;

memory means;

back projector means for back projecting and accumulating said convoluted data into said memory means; and display means for displaying an image in response to said data accumulated in said memory means.

4. The apparatus according to claim 3 wherein said convolution function is given as the convolution of a desired smoothing function s($\phi$) and a generalized function hd($\phi$), said generalized function hd($\phi$) satisfying the following relationships:

$hd(\phi) = -1\lambda\pi \sin^2 \phi$ if $\phi \neq 0$, (i)

$\displaystyle\int_{-\pi/2}^{\pi/2} hd(\phi)d\phi = 0$ (ii)

5. The apparatus according to claim 4 wherein the smoothing function s($\phi$) is defined as follows:

$s(\rho) = 1/\Delta\phi$ if $|\phi| < \Delta\phi/2$ $= \tfrac{1}{2}\Delta\phi$ if $|\phi| = \Delta\phi/2$ $= 0$ if $|\phi| > \Delta\phi/2$ 6. The apparatus according to claim 3 wherein said convolution function h(m$\Delta\phi$) is given as:

$h(m\Delta\phi)=1/(\pi\cdot\Delta\phi)\cdot[\cot\ (m+\frac{1}{2})\Delta\phi-\cot\ (m-\frac{1}{2})\Delta\phi]$ where m is an integer and $m\Delta\phi$ equals the detector fan angle.

7. An apparatus for reconstructing a tomographic image of an object positioned within a scanning circle comprising:
 a source of a fan-shaped beam of radiation having an angle of radiation 2a, said fan-shaped beam rotatable circumferentially about said scanning circle by an angle of $\pi$ plus 2a;
 radiation detection means, including a plurality of detector elements surrounding said scanning circle, for detecting radiation in said beam passing from said source through said scanning circle as said source rotates about said scanning circle, and for producing, in response to said radiation, a source fan set of data for various positions of said source as said source rotates, each said source fan set of data representing the amount of radiation absorbed by a generally fan-shaped region of said object divergent from said source;
 sort means for sorting said source fan sets of data into detector fan sets of data, each said detector fan set of data representing the amount of radiation absorbed by a generally fan-shaped region of said object divergent from a detector element of said radiation detector means, said detector fan sets of data including certain sets which have overlapping data;
 weighting means for weighting said overlapped data wherein one of said weights is given as the following:

$W(\phi,\theta) = 0$ when $\theta < L1(\phi)$;

$= 3\cdot\left(\dfrac{\theta - L1(\phi)}{L3(\phi) - L1(\phi)}\right)^2 - 2\cdot\left(\dfrac{\theta - L1(\phi)}{L3(\phi) - L1(\phi)}\right)^3$ when $L1(\phi) \leqq \theta < L3(\phi)$;

$= 1$ when $L3(\phi) \leqq \theta < L4(\phi)$;

$= 3\cdot\left(\dfrac{L2\phi - \theta}{L2(\phi) - L4(\phi)}\right)^2 - 2\cdot\left(\dfrac{L2(\phi) - \theta}{L2(\phi) - L4(\phi)}\right)^3$ when $L4(\phi) \leqq \theta \leqq L2(\ )$; and $= 0$ when $\theta > L2(\phi)$ and $W(\phi,\theta) = 1 - W(-\phi,\theta + \pi\ 2\phi)$ where
$L1(\phi)=\phi+\arc\sin\ (S\cdot\sin\ \phi/L)$;
$L2(\phi)=\pi+2a+\phi+\arc\sin\ (S\cdot\sin\ \phi/L)$;
$L3(\phi)=\phi-\arc\sin\ (S\cdot\sin\ \phi/L)+2a$; and
$L4(\phi)=\phi+\pi-\arc\sin\ (S\cdot\sin\ \phi/L)$;
$\phi$ is the angular orientation of a ray in the detector fan; $\theta$ is the angular orientation of the detector elements; "a" is one half the source fan angle; L is the distance between the center of the circle and the source; and S is the distance between the center and the detector elements;
 convoluter means for performing a convolution of said detector fan sets of data including data averaged by said weighting means without reordering said detector fan data into parallel ray data to derive convoluted data;
 memory means;
 back projector means for back projecting and accumulating said convoluted data into said memory means; and
 display means for displaying an image in response to said data accumulated in said memory means.

8. An apparatus for reconstructing a tomographic image of an object positioned within a scanning circle comprising:
 a source of a fan-shaped beam of radiation having an angle of radiation 2a, said fan-shaped beam rotatable circumferentially about said scanning circle by an angle of $\pi$ plus 2a;
 radiation detector means including a plurality of detector elements surrounding said scanning circle for detecting radiation in said beam passing from said source through said scanning circle as said source rotates about said scanning circle and for producing in response to said radiation a source fan set of data for each of various positions of said source as said source rotates, each said source fan set of data representing the amount of radiation absorbed by a generally fan-shaped region of said object divergent from said source;
 sort means for sorting said source fan sets of data into detector fan sets of data, each said detector fan set of data representing the amount of radiation absorbed by a generally fan-shaped region of said object divergent from a detector element of said radiation detector means, said detector fan sets of data including certain sets which have overlapping data;
 weight means for averaging said overlapping data by weights other than zero or one;
 convoluter means for convoluting said detector fan sets with a convolution function given as the convolution of a desired smoothing function $s(\phi)$ and a generalized function $hd(\phi)$, said generalized function $hd(\phi)$ satisfying the following relationships:

$hd(\phi)=-1\lambda\pi\sin^2\phi$ if $\phi\neq0$, (i)

$\displaystyle\int_{-\pi/2}^{\pi/2} hd(\phi)d\phi = 0$ (ii)

9. The apparatus according to claim 8 wherein said smoothing function $s(\phi)$ is defined as follows:

$s(\rho) = 1/\Delta\phi$ if $|\phi| < \Delta\phi/2$ $= \frac{1}{2}\Delta\phi$ if $|\phi| = \Delta\phi/2$ $= 0$ if $|\phi| > \Delta\phi/2$ 10. An apparatus for reconstructing a tomographic image of an object positioned within a scanning circle comprising:
 a source of a fan-shaped beam of radiation having an angle of radiation 2a, said fan-shaped beam rotatable circumferentially about said scanning circle by an angle of $\pi$ plus 2a;
 radiation detector means including a plurality of detector elements surrounding said scanning circle for detecting radiation in said beam passing from said source through said scanning circle as said source rotates about said scanning circle and for producing in response to said radiation a source fan set of data for each of various positions of said source as said source rotates, each said source fan set of data representing the amount of radiation absorbed by a generally fan-shaped region of said object divergent from said source;

sort means for sorting said source fan sets of data into detector fan sets of data, each said detector fan set of data representing the amount of radiation absorbed by a generally fan-shaped region of said object divergent from a detector element of said radiation detector means, said detector fan sets of data including certain sets which have overlapping data;

weight means for averaging said overlapping data by weights other than zero or one;

convoluter means for convoluting said detector fan sets using convolution function $h(m\Delta\phi)$ where:

$$h(m\Delta\phi) = 1/(\pi \cdot \Delta\phi) \cdot [\cot\,(m+\tfrac{1}{2})\Delta\phi - \cot\,(m-\tfrac{1}{2})\Delta\phi]$$

where m is an integer and $m\Delta\phi$ equals the detector fan angle;

memory means;

back projector means for back projecting and accumulating said convoluted data into said memory means; and display means for displaying an image in response to said data accumulated in said memory means.

* * * * *